(12) United States Patent
Shiwa et al.

(10) Patent No.: US 11,219,916 B2
(45) Date of Patent: Jan. 11, 2022

(54) SURFACE TREATMENT SYSTEM FOR LARGE OBJECT

(71) Applicant: Taikisha Ltd., Tokyo (JP)

(72) Inventors: Hideo Shiwa, Tokyo (JP); Yasuto Teramoto, Tokyo (JP); Genji Nakayama, Tokyo (JP); Hiroyuki Suzuki, Tokyo (JP)

(73) Assignee: Taikisha Ltd., Tokyo (JP)

( * ) Notice: Subject to any disclaimer, the term of this patent is extended or adjusted under 35 U.S.C. 154(b) by 127 days.

(21) Appl. No.: 16/615,225

(22) PCT Filed: Oct. 9, 2018

(86) PCT No.: PCT/JP2018/037570
§ 371 (c)(1),
(2) Date: Nov. 20, 2019

(87) PCT Pub. No.: WO2019/111522
PCT Pub. Date: Jun. 13, 2019

(65) Prior Publication Data
US 2020/0171527 A1    Jun. 4, 2020

(30) Foreign Application Priority Data
Dec. 5, 2017 (JP) .............................. JP2017-233712

(51) Int. Cl.
*B05B 13/04* (2006.01)
*B05B 12/08* (2006.01)
(Continued)

(52) U.S. Cl.
CPC .......... *B05B 13/0431* (2013.01); *B05B 12/08* (2013.01); *B25J 5/00* (2013.01); *B25J 11/0075* (2013.01)

(58) Field of Classification Search
None
See application file for complete search history.

(56) References Cited

U.S. PATENT DOCUMENTS

| | | | | |
|---|---|---|---|---|
| 3,760,956 A | * | 9/1973 | Burch | ................. G05B 19/063 |
| | | | | 414/744.3 |
| 9,827,677 B1 | * | 11/2017 | Gilbertson | ........... B25J 15/0014 |

(Continued)

FOREIGN PATENT DOCUMENTS

| | | |
|---|---|---|
| CN | 105253319 A | 1/2016 |
| JP | 31784 U | 1/1991 |

(Continued)

*Primary Examiner* — Jethro M. Pence
(74) *Attorney, Agent, or Firm* — The Webb Law Firm

(57) ABSTRACT

Provided is surface treatment system for a large object having high versatility. In a surface treatment system for a large object configured to cause a treatment machine for treating a surface of the object to be held by a leading end portion of a work arm of a work robot and to move the treatment machine relative to the surface of the object by a movement of the work robot thus treating the surface of the object by the treatment machine, there is provided a trackless type work machine mounting the work robot on a self-propelled cart. The work machine mounts a robot moving device for moving the work robot relative to the self-propelled cart at least in a height direction and mounts also a battery capable of supplying traveling power for the self-propelled cart.

6 Claims, 14 Drawing Sheets

(51) Int. Cl.
*B25J 11/00* (2006.01)
*B25J 5/00* (2006.01)

(56) References Cited

U.S. PATENT DOCUMENTS

| | | |
|---|---|---|
| 2015/0375390 A1 | 12/2015 | Becroft et al. |
| 2016/0011593 A1 | 1/2016 | Oberoi et al. |
| 2017/0312923 A1* | 11/2017 | Erickson ................. B25J 18/02 |
| 2019/0168388 A1* | 6/2019 | Pringle, IV ............... B64F 5/00 |

FOREIGN PATENT DOCUMENTS

| | | |
|---|---|---|
| JP | 10015860 A | 1/1998 |
| JP | 10503144 A | 3/1998 |
| JP | 2002158062 A | 5/2002 |
| JP | 2016016861 A | 2/2016 |

* cited by examiner

SURFACE TREATMENT SYSTEM FOR LARGE OBJECT

CROSS REFERENCE TO RELATED APPLICATIONS

This application is the United States national phase of International Application No. PCT/JP2018/037570 filed Oct. 9, 2018, and claims priority to Japanese Patent Application No. 2017-233712 filed Dec. 5, 2017, the disclosures of which are hereby incorporated by reference in their entirety.

TECHNICAL FIELD

This invention relates to a surface treatment system for a large object configured to carry out various surface treatments such as a cleaning treatment, a paint coat peeling treatment, a polishing treatment, a painting treatment, etc. on a surface of a large object such as an aircraft.

More particularly, the invention relates to a surface treatment system for a large object configured to cause a treatment machine for treating a surface of the object to be held by a leading end portion of a work arm of a work robot and to move the treatment machine relative to the surface of the object by a movement of the work robot, thus treating the surface of the object by the treatment machine.

BACKGROUND ART

Conventionally, an aircraft surface treatment system (see FIG. 18) disclosed in Patent Document 1 identified below includes a self-propelled cart 34 which travels along a guide wire 33 installed on a floor 32.

Further, this work machine 31 includes a rotary column 35 mounted vertically on the self-propelled cart 34 and an articulated type robot arm 36 which is elevated or lowered under a horizontal posture along the rotary column 35. And, a treating machine 37 for treating a machine body outer face of an aircraft W is mounted to the leading end portion of this robot arm 36.

In a ceiling section inside a building structure, a rail 38 is extended in correspondence with the aircraft W accommodated therein, and a movable device 39 driven to be movable along this rail 38 and the upper end portion of the rotary column 35 are connected to each other via a utility boom 40.

This utility boom 40 is configured to allow a high-pressure cleaning water line, an electric power source, a control data line, an air line, a depressurization line, etc. from the ceiling section of the building structure to reach the work machine 31.

BACKGROUND ART DOCUMENT

Patent Document

Patent Document 1: Japanese Unexamined Patent Application Publication (Translation of PCT Application) No. Hei. 10-503144

SUMMARY OF THE INVENTION

Problem to be Solved by Invention

However, with the surface treatment system disclosed in Patent Document 1, the movement path of the work machine 31 is restricted by the guide wire 33 extended and installed on the floor and/or the rail 38 extended in the ceiling section. So, it is difficult to cope flexibly with a difference in size and/or shape of the aircraft W as a treatment subject.

Therefore, there is a problem of the versatility of the system being low as it allows treatment of only limited types of aircrafts W. Moreover, even if a certain treatment is possible when an aircraft W as a treatment subject is of a type close to the treatable type, it is difficult to move the work machine 31 to the most appropriate position for a respective part of the aircraft as the treatment subject, so that there remains a problem of inviting reduction in the work convenience/efficiency and reduction in the treatment quality.

Moreover, as installation costs are high for the guide wire 33 and the rail 38 which need to be installed and extended over long distances on the floor or the ceiling section and the versatility of the system is low also, there arises the problem of disadvantage in terms of costs.

In view of the above-described state of the art, the principal object of the present invention is to solve the above-described problems through reasonable improvements on the work machine for treatment work.

Solution to the Problems

A first characterizing feature of the present invention relates to a surface treatment system for a large object, according to this characterizing feature, there is provided:

a surface treatment system for a large object configured to cause a treatment machine for treating a surface of the object to be held by a leading end portion of a work arm of a work robot and to move the treatment machine relative to the surface of the object by a movement of the work robot, thus treating the surface of the object by the treatment machine, the surface treatment system comprising:

a trackless type work machine mounting the work robot on a self-propelled cart;

wherein the work machine mounts a robot moving device for moving the work robot relative to the self-propelled cart at least in a height direction and mounts also a battery capable of supplying traveling power for the self-propelled cart.

With this first characterizing feature, a treatment work machine which mounts a work robot on a self-propelled cart is configured as a trackless type work machine (namely, a work machine free from the restriction imposed on its movement path by certain guide tool such as the guide wire 33 and the ceiling rail 38 disclosed in Patent Document 1). Therefore, irrespectively of the size and/or shape of the treatment subject, it is possible to move the work machine flexibly to the most appropriate work position for respective part of the treatment subject.

Further, as the self-propelled cart can be caused to travel by power supplied from the battery mounted on the work machine, it is also possible to move the work machine without restriction in its movement by an electric power line or cable.

For these reasons mentioned above, treatment is possible with keeping the working convenience/efficiency and treatment quality high for objects of different sizes and/or shapes, so that versatility can be enhanced thereby also.

Moreover, no need of installing any guide wire or rail whose extension distances are large allows for significant reduction in the installation costs, whereby the versatility can be enhanced also. Consequently, the cost-wise advantage of the system too can be increased effectively.

A second characterizing feature of the present invention specifies a preferred mode of embodying the first characterizing feature. According to this second characterizing feature:

the work machine includes, as the robot moving device, an extendible/contractible lift device configured to vertically move a lift table by an extension/contraction movement and an extendible/contractible feeder device mounted on the lift table and configured to move a feeder table by an extension/contraction movement closer to or away from the lift table in the horizontal direction; and the work robot is mounted on the feeder table.

With this second characterizing feature, by a contraction movement of the feeder device in the horizontal direction, the work robot is moved in the direction of this contraction movement closer to the lift table.

Therefore, in comparison with an arrangement in which the work robot is moved closer to the lift table through its movement in the horizontal direction by a flexing movement of a flexion type arm held to the leading end portion, the work robot can be moved closer to the lift table in a compact manner, with less influence to its surrounding, such as an interference between the flexion arm and another object.

Moreover, according to this second characterizing feature, the lift table is elevated or lowered through an extension/contraction movement of the lift device.

Therefore, in comparison with e.g. a type of arrangement in which the lift table is elevated/lowered along a column, the work machine can be set under a compact state in the height direction with the contraction of the lift device, when the lift table is lowered.

For these reasons mentioned above, it is possible to move the work machine or the work robot mounted thereon even more flexibly to the most appropriate work position for respective part of the treatment subject. Thus, the work convenience/efficiency and the treatment quality of the surface treatment of a large object can be further enhanced and the versatility of the system can also be further enhanced.

A third characterizing feature of the present invention specifies a preferred mode of embodying the first or second characterizing feature. According to this third characterizing feature:

the work machine includes a power source connection section configured to receive supply of electric power from a power source section located nearest in its surrounding.

With this third characterizing feature, in case there is no power source section (or unit) near the work machine or a power cable or wire can be an obstacle in the movement of the work machine, the work machine can be moved by causing the self-propelled cart to travel with traveling power supplied from the battery mounted on the work machine. Further, in case a power cable or wire connected to such power source section is not to be any obstacle, by connecting the power source connection section provided in the work machine to such power cable present nearby, the power for work can be obtained from this power source section (unit).

Therefore, with this third characterizing feature, by mounting a battery on the work machine, it is possible to increase the flexibility of movement of the work machine and also to secure sufficient power for work easily.

A fourth characterizing feature of the present invention specifies a preferred mode of embodying any one of the first through third characterizing features. According to this fourth characterizing feature:

as the work machine, there are provided a high-place (aerial) work machine mounting the robot moving device for a high place having a high maximum reach height in the movement of the work robot in the height direction and a low-place work machine mounting the robot moving device for a low place having a low maximum reach height in the movement of the work robot in the height direction.

With this fourth characterizing feature, treatment works can be carried out with using both the high-place work machine and the low-place work machine in a work sharing mode, with carrying out a treatment work for a high place part of the large object as the treatment subject by the high-place work machine while carrying out a treatment work for a low place part of the large object as the treatment subject by the low-place work machine, in parallel therewith.

Therefore, the work efficiency of surface treatment for a large object can be enhanced effectively.

Further, in case both a treatment of a high place part and a low place part of a large object are to be carried out by one kind of work machine, there will arise a problem of the configuration of the work machine becoming complicated in order to make it possible to cope with both the high place part and the low place part.

In this regard, according to the fourth characterizing feature described above, as the treatment subject parts will be limited for the high-place work machine and the low-place work machine respectively, the configurations of these work machines can be made simple, whereby the manufacture costs of the work machine(s) can be reduced also, thus the cost-wise advantage can be increased even more.

A fifth characterizing feature of the present invention specifies a preferred mode of embodying any one of the first through fourth characterizing features. According to this fifth characterizing feature:

the work machine mounts a plurality of kinds of the treatment machines that are exchangeable and detachably attachable to the leading end portion of the work arm respectively.

With this fifth characterizing feature, when it becomes necessary to change the treatment machine to be held to the leading end portion of the work arm of the work robot, the treatment machine to be held to the leading end portion of the work arm can be changed without taking a trouble of e.g. transporting a treatment machine for replacement from a storage site distant from the work machine.

Therefore, the work convenience/efficiency in the surface treatment of a large object can be enhanced even more.

Incidentally, in embodying the fifth characterizing feature, preferably, the work machine mounts a treatment machine changer device for automatically carrying out a change of the treatment machine to be held to the leading end portion of the work arm in cooperation with the work robot.

A sixth characterizing feature of the present invention specifies a preferred mode of embodying any one of the first through fifth characterizing features. According to this sixth characterizing feature:

the work machine mounts a supply source device for supplying the treatment machine with a fluid to be used in the surface treatment of the large object.

With this sixth characterizing feature, as the work machine mounts a supply source device (e.g. a compressor, a treatment liquid tank, a treatment liquid pump, etc.) for supplying the treatment machine with a fluid to be used in the surface treatment of the large object, it becomes possible to omit e.g. a supply hose needed for supplying the work machine with a fluid (e.g. a compressed air, a treatment liquid, etc.) for use in the surface treatment of the object from a stationary facility separate from the work machine.

Therefore, the flexibility in the movement of the work machine can be enhanced even more.

EMBODIMENTS

Figure 1:
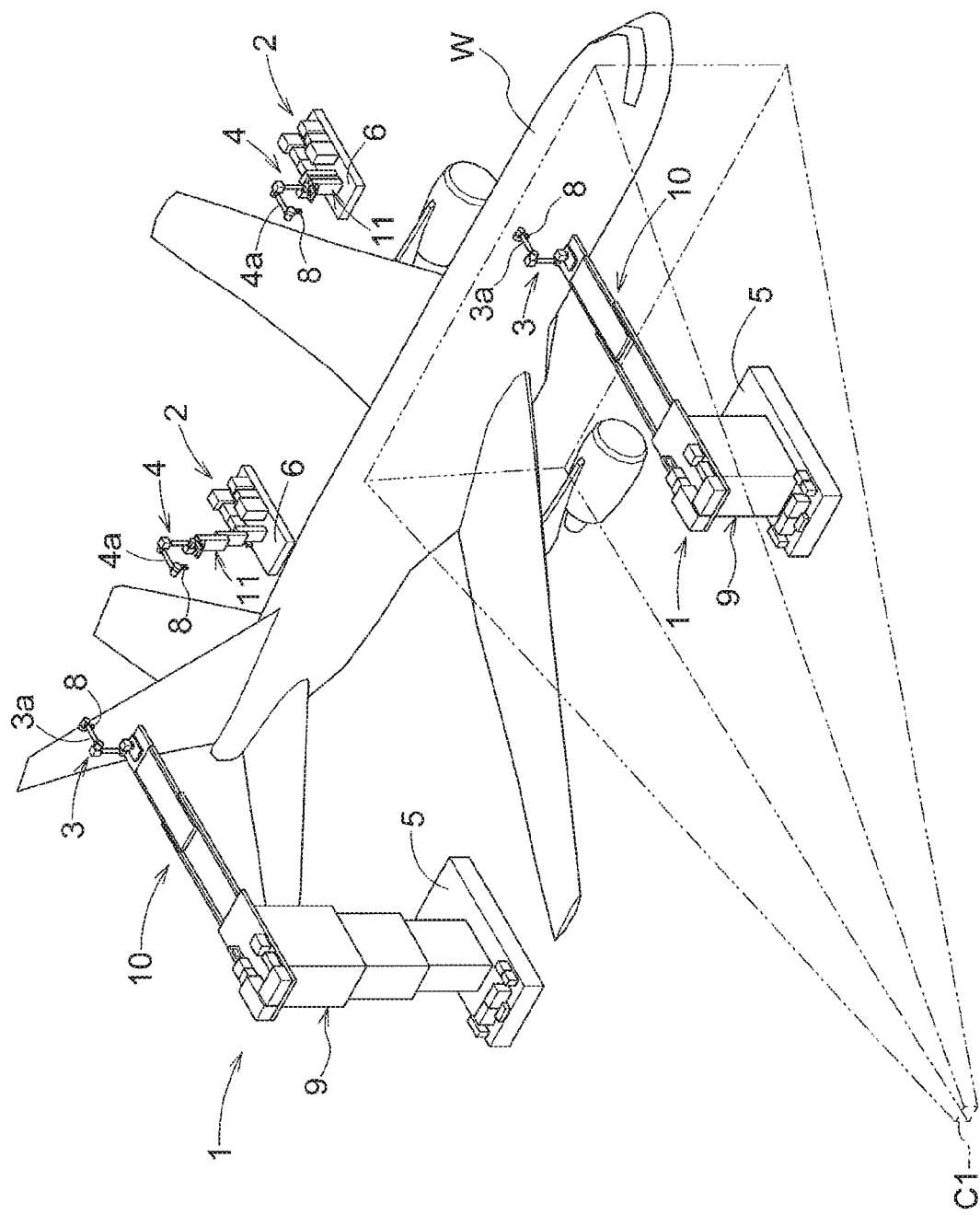
FIG. 1 is a perspective view showing a work state of a surface treatment work on a large aircraft.

FIGS. 1-4 respectively show a situation in which a surface treatment work is being carried out on a machine body outer face of an aircraft W inside a building structure.

In this surface treatment work, on a machine body outer face of the aircraft W, various surface treatments such as a cleaning treatment, a paint coat peeling treatment, a paint surface treatment, a polishing treatment, a painting treatment, etc. are carried out one after another.

Inside a building structure accommodating the aircraft W as a "treatment subject", there are set a high-place work machine 1 and a low-place work machine 2. Each one of these work machines 1, 2 mounts a turnable work robot 3, 4 having an articulated type work arm 3a, 4a.

Figure 2:
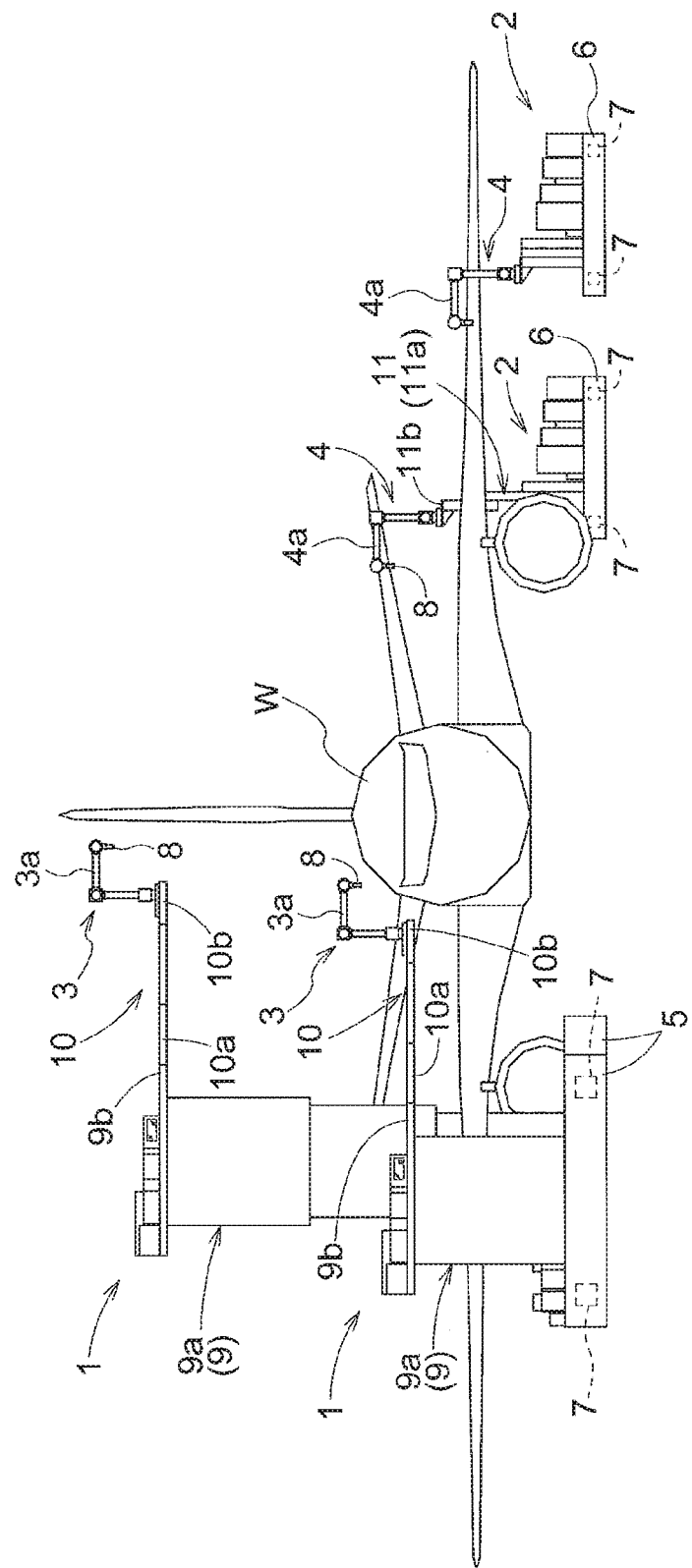
FIG. 2 is a front view showing also a work state of a surface treatment work on a large aircraft.
Figure 3:
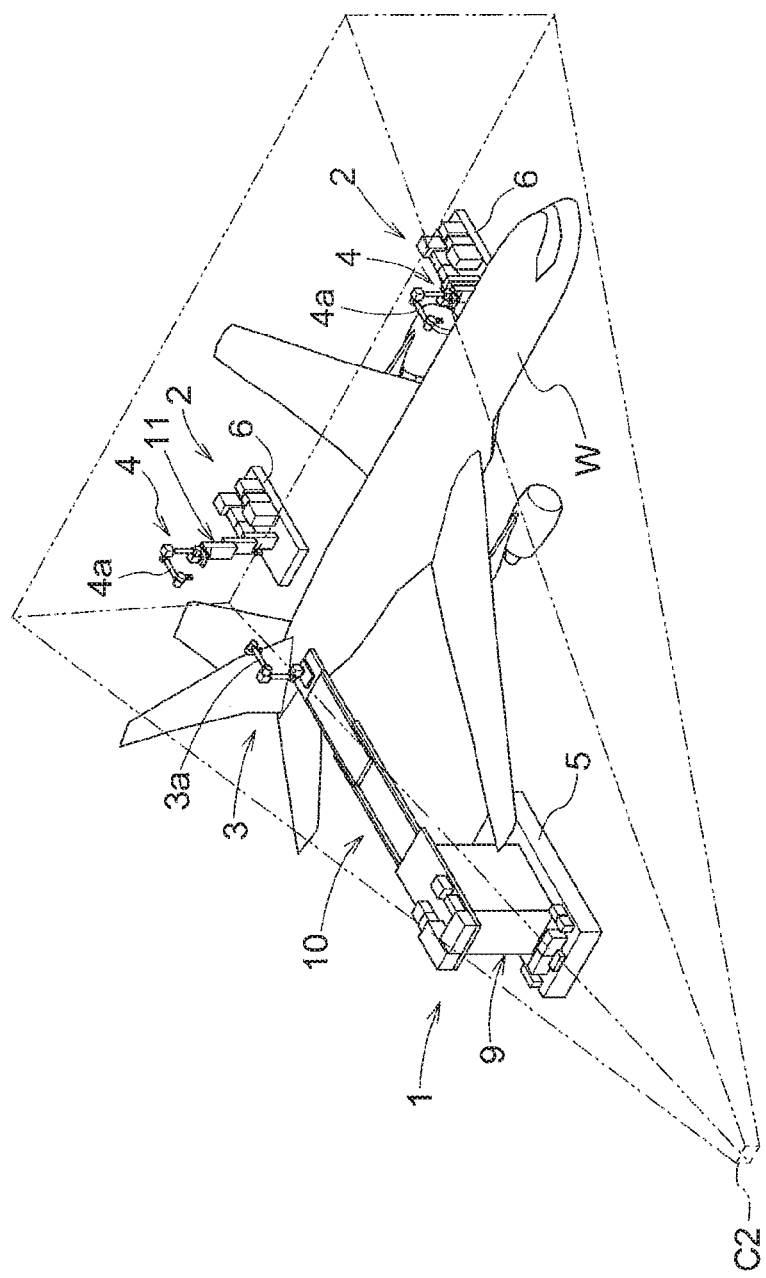
FIG. 3 is a perspective view showing a work state of a surface treatment work on a small aircraft.
Figure 4:
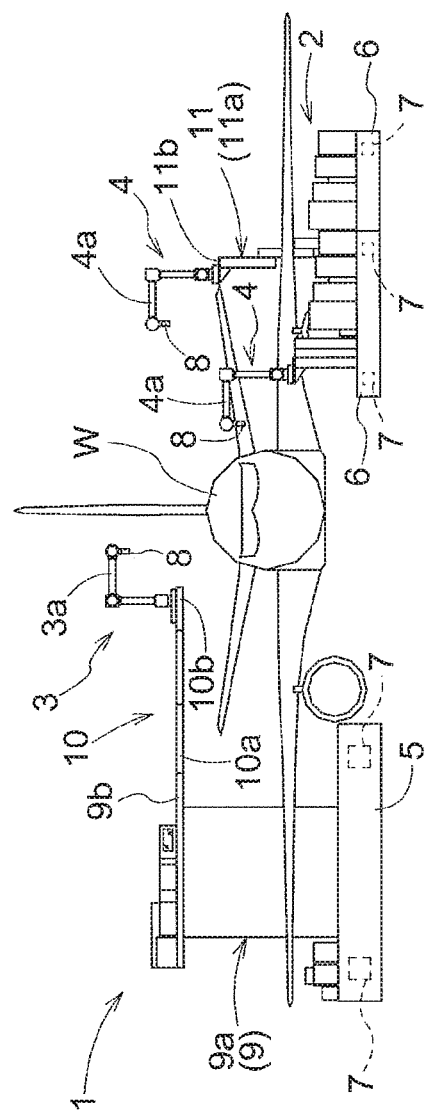
FIG. 4 is a front view showing also a work state of a surface treatment work on a small aircraft.

FIG. 1 and FIG. 2 show a case in which the treatment subject is a large aircraft W. FIG. 3 and FIG. 4 show a case in which the treatment subject is a relatively small aircraft W.

In both the cases, treatment works on high-place parts (e.g. a fuselage upper side, a wing upper side, a vertical tail, etc.) of the aircraft W are carried out by the high-place work machine 1. On the other hand and in parallel therewith, treatment works on low-place parts (e.g. a fuselage lower side, a wing lower side, etc.) of the aircraft W are carried out by the low-place work machine 2. Thus, the treatment works are carried out in a mode of work sharing using both the high-place work machine 1 and the low-place work machine 2 on the entire outer face of the machine body of the aircraft W.

Each work machine 1, 2 includes a trackless type electrically powered self-propelled carts 5, 6. Further, there is provided no rail or guide line that restricts the movement paths of the respective work machines 1, 2. In this sense, these respective work machines 1, 2 are "trackless" work machines.

And, the self-propelled cart 5, 6 of the respective work machine 1, 2 can travel to any desired orientation (direction) in the horizontal direction, without involving any change in the orientation of the cart body (i.e. the cart body posture as seen in the plan view).

From the above-described arrangements, each work machine 1, 2 can move speedily to a desired position on the floor inside the building structure.

Further, these self-propelled carts 5, 6 can change to any desired orientation in the horizontal direction, without involving any change in the orientation of the cart body (i.e. the cart body posture as seen in the plan view).

With the above, each work machine 1, 2 can speedily change its orientation to any orientation in the horizontal direction at each position.

The respective self-propelled cart 5, 6 mounts also a tilt adjustment device 7 for adjusting tilt of the cart body relative to the horizontal direction. By activating this tilt adjustment device 7, the tilt of the cart body relative to the horizontal direction can be adjusted in any direction in the horizontal direction.

In each work machine 1, 2, the work robot 3, 4 is mounted on the self-propelled cart 5, 6 via a robot moving device X.

Therefore, by moving the respective work machine 1, 2 to a work position near the aircraft W via traveling of the respective self-propelled cart 5, 6 and then activating the robot moving device X, it is possible to move the work robot 3, 4 to a position that allows work on a target part of the aircraft W (that is, a position that allows treatment of the target part in the machine body surface of the aircraft W by a treatment machine 8 held to the leading end portion of the work arm 3a, 4a).

Figure 5:
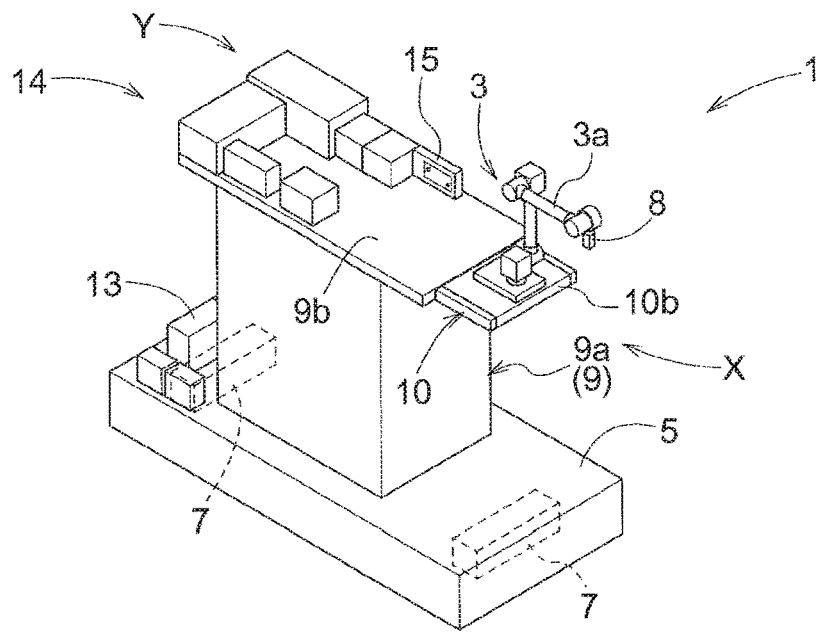
FIG. 5 is a perspective view of a high-place work machine under a state thereof with a lift device and a feeder device thereof being contracted respectively.
Figure 6:
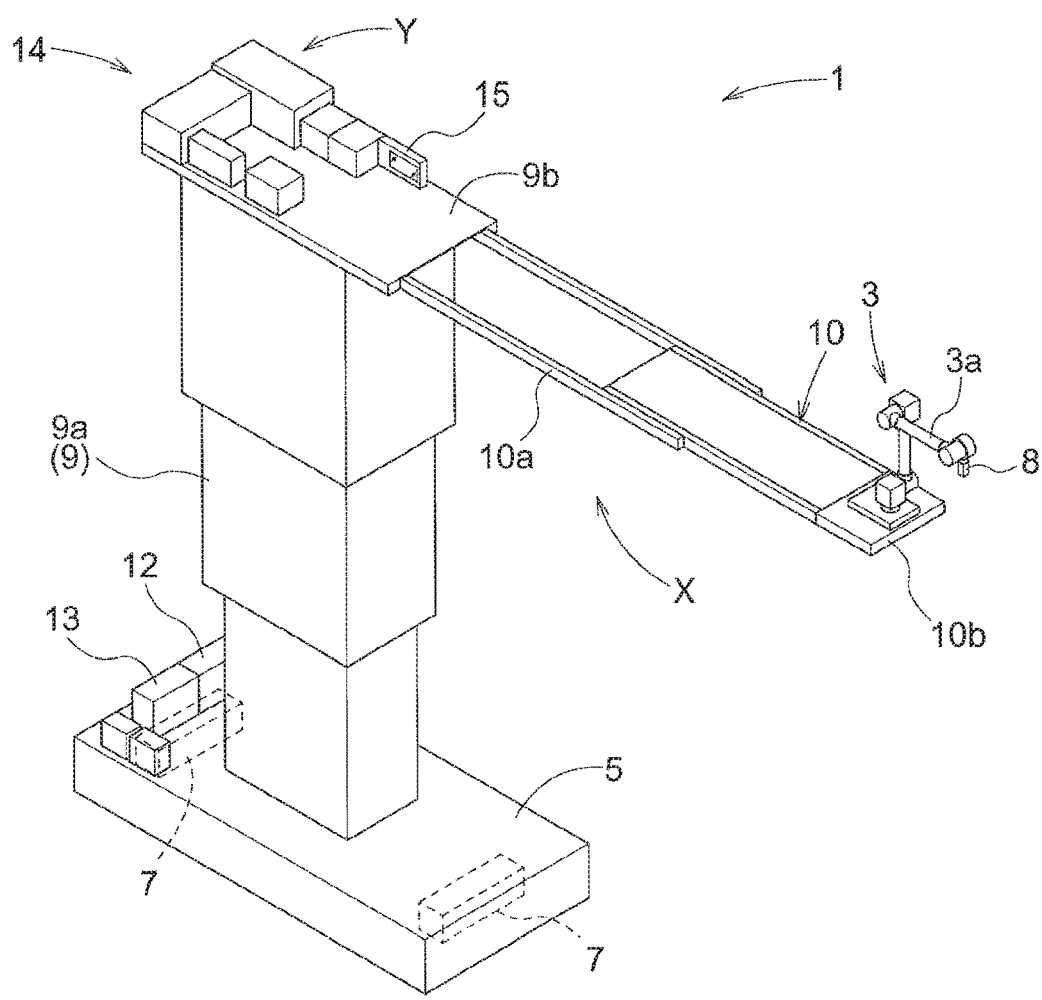
FIG. 6 is a perspective view of the high-place work machine under a state thereof with the lift device and the feeder device thereof being extended respectively.

As shown in FIG. 5 and FIG. 6, the high-place work machine 1 includes, as the robot moving device X, an extension/contraction tower type lift device 9 installed on the platform of the self-propelled cart 5 and an extension/contraction arm type feeder device 10 mounted to a lift table 9b at the upper end of an extension/contraction tower section 9a of this lift device 9.

And, such work robot 3 is mounted also on a feeder table 10b provided at the leading end portion of an extension/contraction arm 10a of the feeder device 10.

The lift device 9 is capable of elevating the work robot 3 to a height (altitude) that allows a work on an upper end portion of the vertical tail of the large aircraft W by extending upwards the extension/contraction tower section 9a to its maximum extended state shown in FIG. 6.

Also, the feeder device 10 is capable of feeding the work robot 3 in the horizontal direction to a position that allows a work on lateral width-wise center portion of a fuselage upper side portion of the large aircraft W by extending the extension/contraction arm 10a to its maximum extended state shown also in FIG. 6.

Both of these lift device 9 and feeder device 10 are configured such that the extension/contraction tower section 9a or the extension/contraction arm 10a thereof is extended/contracted via a transmission mechanism such as a rack-pinion mechanism or a ball-screw mechanism by a servo motor.

Therefore, by adjusting the extension amount of the extension/contraction tower section 9a or the extension/contraction arm 10a by an operation of the servo motor, the position of the respective work robot 3 relative to the aircraft W can be adjusted in accordance with the particular body shape of the aircraft W.

Figure 7:
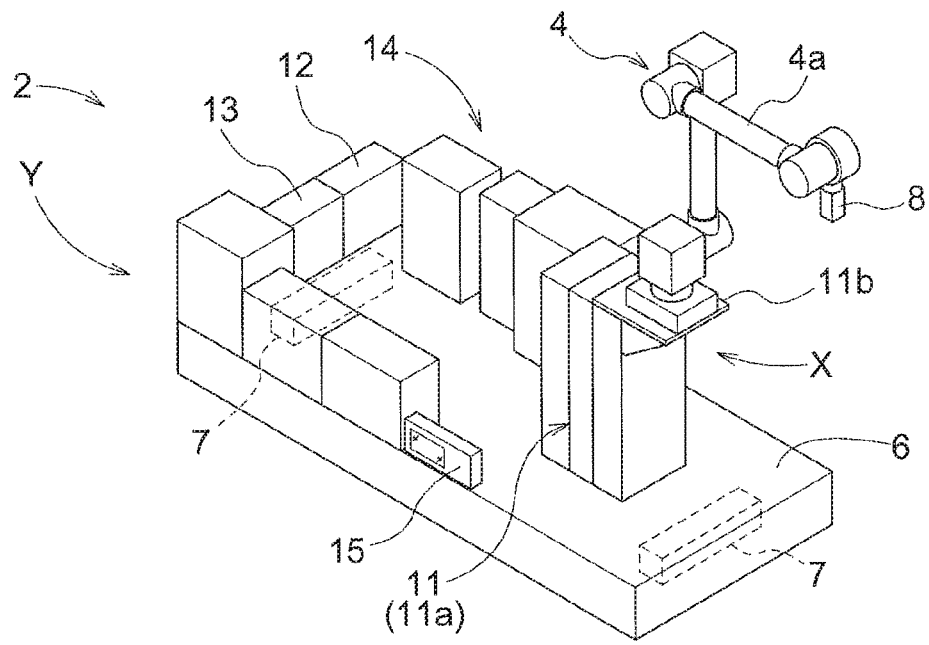
FIG. 7 is a perspective view of a low-place work machine under a state thereof with a lift device being contracted.
Figure 8:
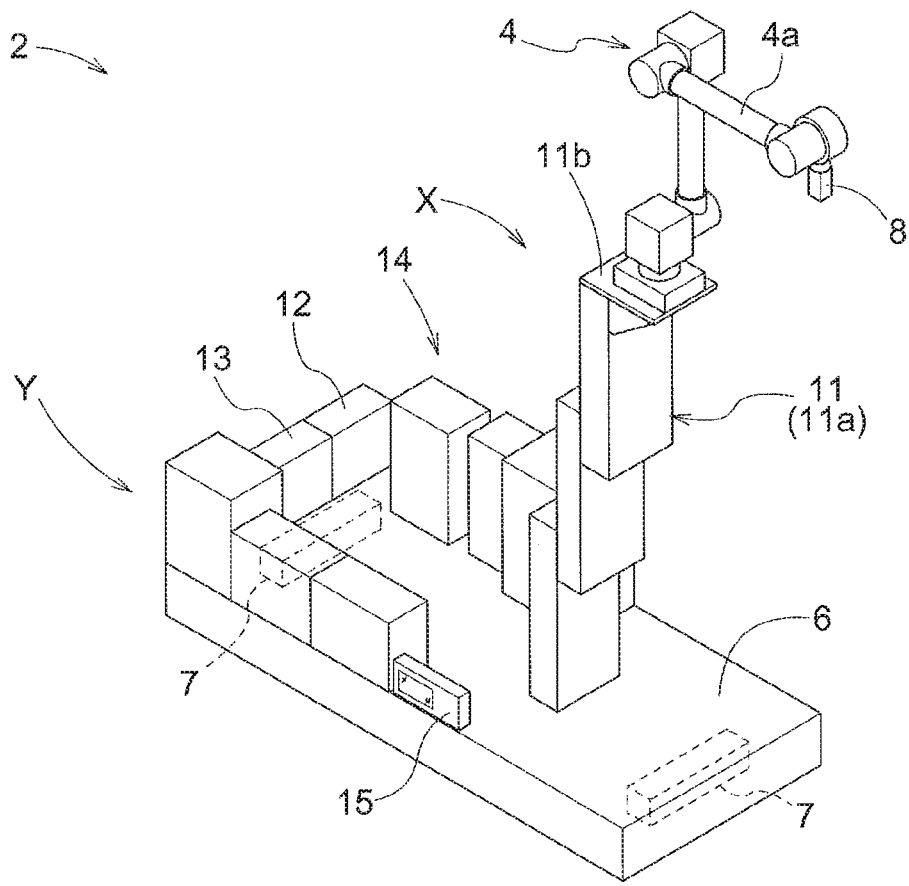
FIG. 8 is a perspective view of the low-place work machine under a state thereof with the lift device being extended.

As shown in FIG. 7 and FIG. 8, the low-place work machine 2 includes, as its robot moving device X, an extension/contraction boom type lift device 11 mounted on the self-propelled cart 6.

And, the work robot 4 is mounted on a lift table 1ib provided at the leading end portion of the extension/contraction boom 11a of the lift device 11.

This lift device 11 too is configured such that the extension/contraction boom 11a thereof is extended/contracted via a transmission mechanism such as a rack-pinion mechanism or a ball-screw mechanism by a servo motor.

Therefore, by adjusting the extension amount of the extension/contraction boom 11a by an operation of the servo motor, the position of the work robot 4 relative to the aircraft W can be adjusted in accordance with the particular body shape of the aircraft W.

Incidentally, the transmission mechanism of the respective lift device 9, 11 and the feeder device 10 is not limited to a rack-pinion mechanism or a ball-screw mechanism, but other various types of transmission mechanism can be employed.

Each self-propelled cart 5, 6 includes a power source connection section 12 and mounts a battery 13.

And, the self-propelled carts 5, 6 and the various electric devices mounted on these self-propelled carts 5, 6 such as the work robots 3, 4, the lift devices 9, 11, the feeder device 10, etc. can be operated by either electric power supplied from a power line connected to the power source connection section 12 or electric power supplied from the battery 13.

The treatment machines 8 to be held to the leading end portions (namely, the "wrist" portions) of the work arms 3a, 4b of the work robots 3, 5 can be changed in accordance with a type of the surface treatment to be carried out.

A plurality of kinds of such treatment machines 8 for replacement are set under a condition that allows automatic change (replacement) through a cooperative action between the work robot 3, 4 and a treatment machine changer device, and these treatment machines are stored and accommodated as such in a treatment machine accommodation section 14 of each work machine 1, 2.

Further, each work machine 1, 2 mounts also various kinds of supply source devices Y such as a compressor for feeding compressed air to the treatment machine held by the work robot 3, 4 in a treatment work using the compressed air or a tank and a pump for feeding paint and curing liquid to the treatment machine 8 (painting machine) held by the work robot 3, 4 in a painting treatment.

Incidentally, as for the various kinds of electric devices to be mounted on the respective work machines 1, 2, these devices are provided with explosion-proof feature for reliably preventing e.g. fire-catching trouble at the time of e.g. painting treatment.

Figure 17:
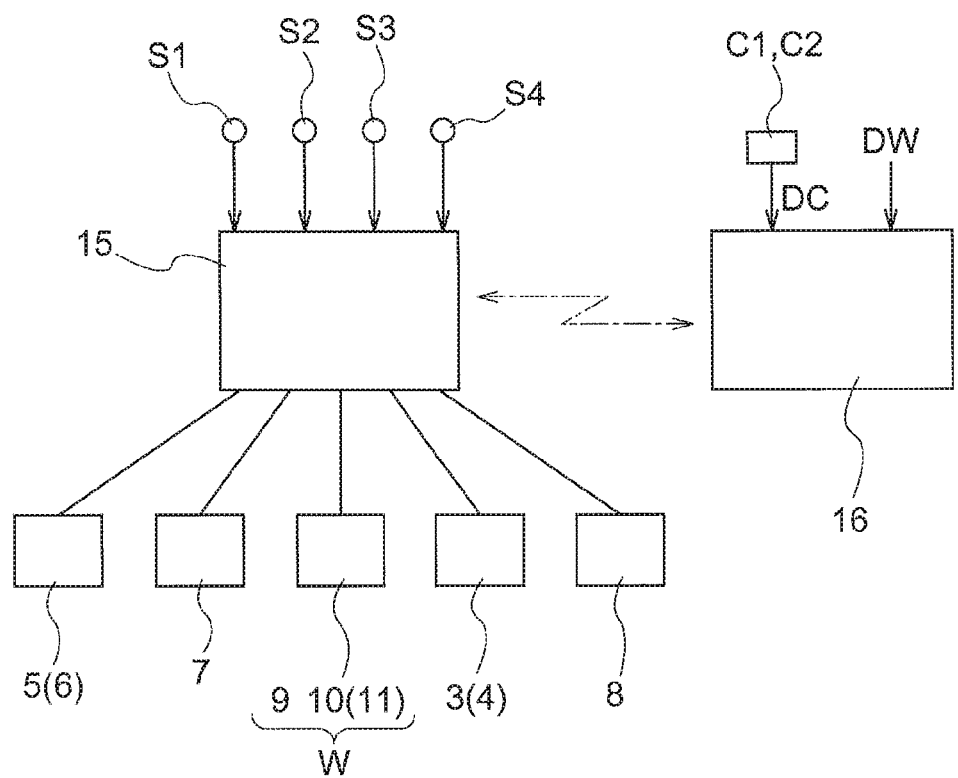
FIG. 17 is a control block diagram.
Figure 18:
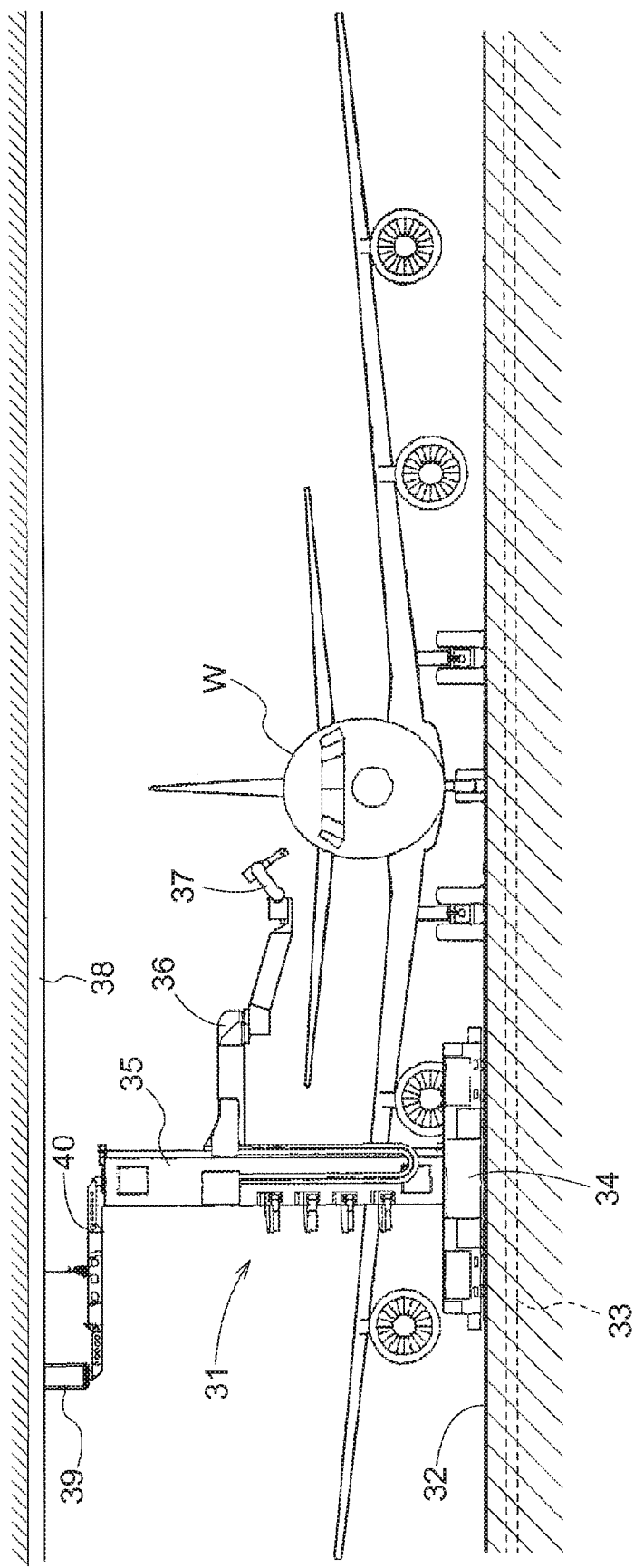
FIG. 18 is a front view showing a conventional aircraft surface treatment system.

On the other hand, in the respective work machines 1, 2 (see FIG. 17), laser type movement distance sensors S1 for determining a distance relative to a nearby object are mounted at respective parts (e.g. the four corner portions of the self-propelled cart 5, 6, the feeder table 10b of the feeder device 10, the lift table lib of the extension/contraction boom lift device 11, etc.) of the work machine 1, 2.

Further, the respective work machine 1, 2 mounts also a level (horizontal level) sensor S2 for determining a level (horizontal level) of the self-propelled cart 5, 6.

Moreover, the work arm 3a, 4a of the work robot 3, 4 of the respective work machine 1, 2 mounts also a laser type treatment distance sensor S3 for determining a distance relative to a machine outer face of the aircraft W, a laser type protruding object sensor S4 for detecting any protruding object present on the machine outer face of the aircraft W, and so on.

And, each work machine 1, 2 mounts an onboard controller 15. This onboard controller 15 controls the self-propelled cart 5, 6 and the various mounted devices such as the work robot 3, 4, etc.

On the other hand, in the building structure accommodating the aircraft W as the treatment subject, a plurality of position determination cameras C1, C2 for image-capturing the surrounding area of the accommodated aircraft W are installed at respective parts in distribution and a general controller 16 is also provided.

The onboard controllers 15 mounted on the respective work machines 1, 2 and the general controller 16 are control devices responsible for controlling of the surface treatment system having both the work machines 1, 2.

Next, a mode of work of a surface treatment work carried out by using these high-place work machine 1 and low-place work machine 2 will be explained with reference to FIGS. 9 through 17. As this work mode is same for both the work machines 1, 2, here, explanation will be made mainly for the high-place work machine 1 as representing the mode.

<First Step>

Figure 9:
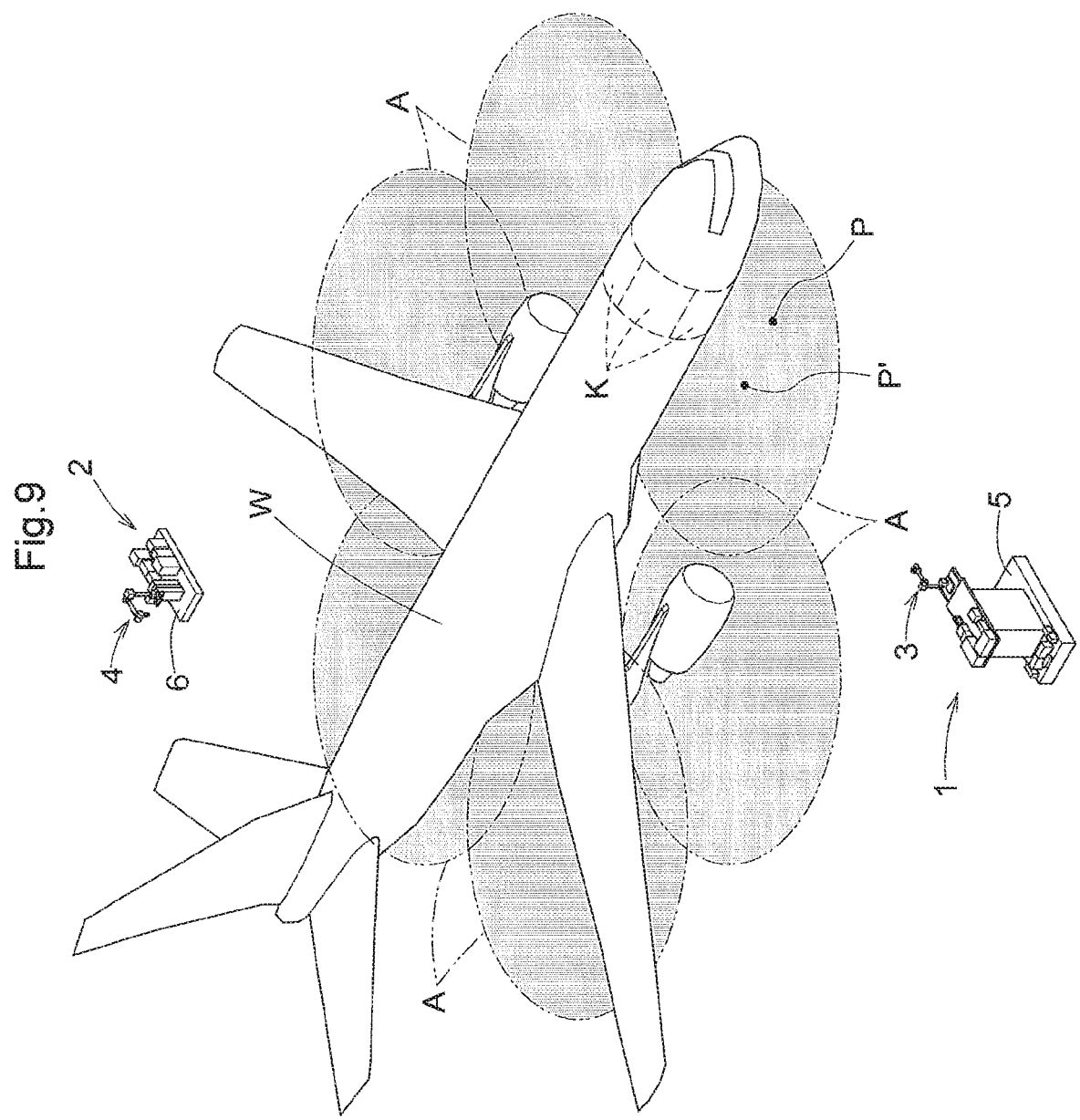
FIG. 9 is a perspective view showing a condition in which a work machine is set under a standby condition.

As shown in FIG. 9, a plurality of work areas A are set in advance around the aircraft W accommodated inside the building structure. Here, each work area A has a size corresponding to a range whose image can be captured by the position determination cameras C1.

Further, on the machine outer face of the accommodated aircraft W, there are set a plurality of treatment sections K arranged in a matrix for dividing this machine outer face into a plurality of sections.

Incidentally, the setting of these treatment sections K may be made automatically by the general controller 16, based on three-dimensional shape data Dw of the aircraft W obtainable from a designing document of the aircraft W.

<Second Step>

Figure 10:
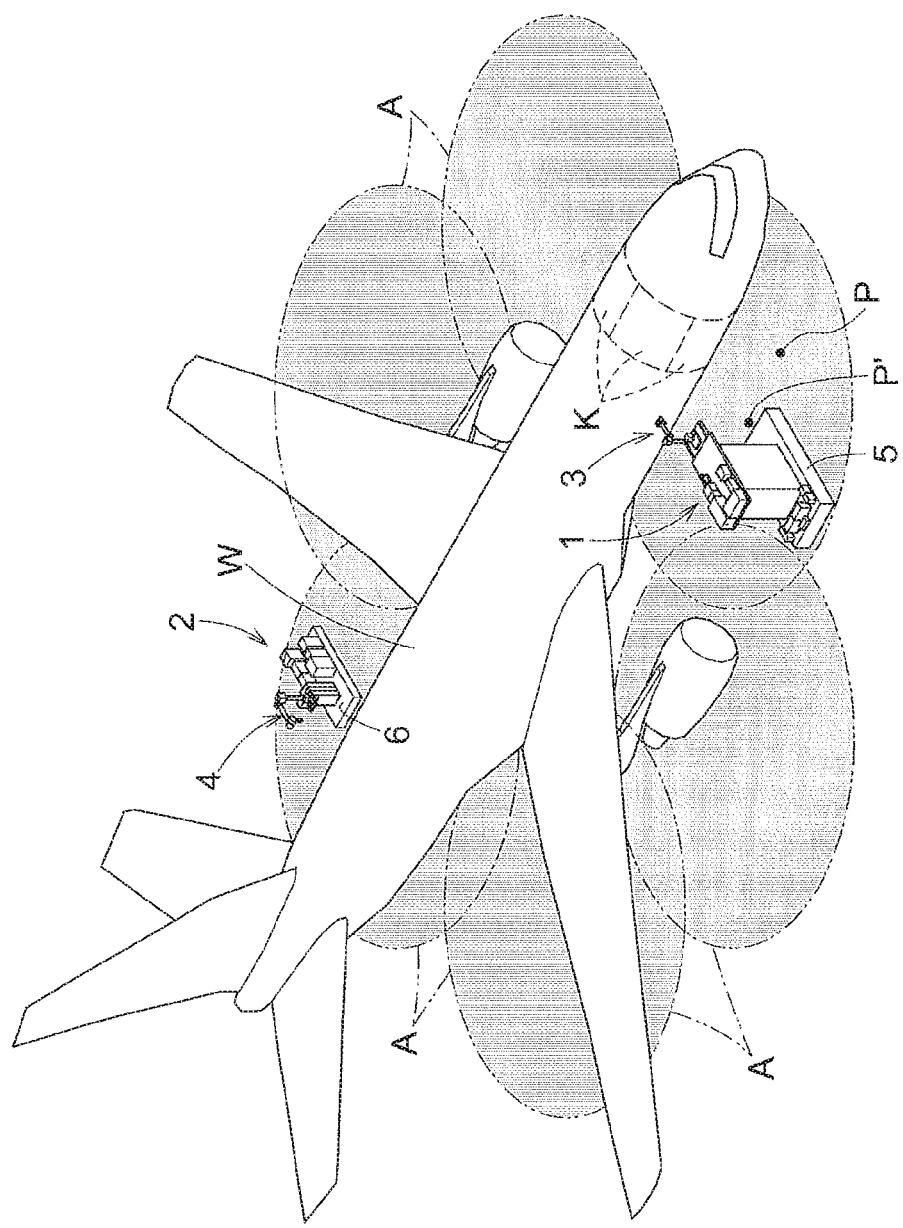
FIG. 10 is a perspective view showing a condition in which the work machine has been moved into a work area.

As shown in FIGS. 9 and 10, by a manual operation on the general controller 16 or the onboard controller 15, the work machine 1 is moved into a certain work area A from its standby position outside the work area A.

In this movement operation, the manual operation on the general controller 16 or the onboard controller 15 can be a remote manual operation using a remote controller or a direct manual operation on the general controller 16 or the onboard controller 15.

Further, in this movement into the work area A, the self-propelled cart 5 of the work machine 1 is caused to travel by electric power supplied from the battery 13, without using the power source connection section 12.

After the work machine 1 is moved into the work area A, in order to secure further electric power for a (utility) work subsequent thereto, a power line extend from a nearby power supply section will be connected to the power supply connection section 12 of the work machine 1.

<Third Step>

After this power connection, based on the three-dimensional shape data Dw of the aircraft W inputted in advance to the general controller 16 and captured-image data Dc transmitted wirelessly from the position determination camera C1 set at a predetermined position (i.e. the captured-image data of the work area A where a portion of the aircraft W and the work machine 1 are present), the relative positional relation between the work machine 1 and the aircraft W is caused to be recognized by the general controller 16.

And, based on this recognized relative position relation between the work machine 1 and the aircraft W, a movement instruction for moving the work machine 1 to a designated work position P nearby the aircraft W is transmitted wirelessly from the general controller 16 to the onboard controller 15 of the work machine 1.

Figure 11:
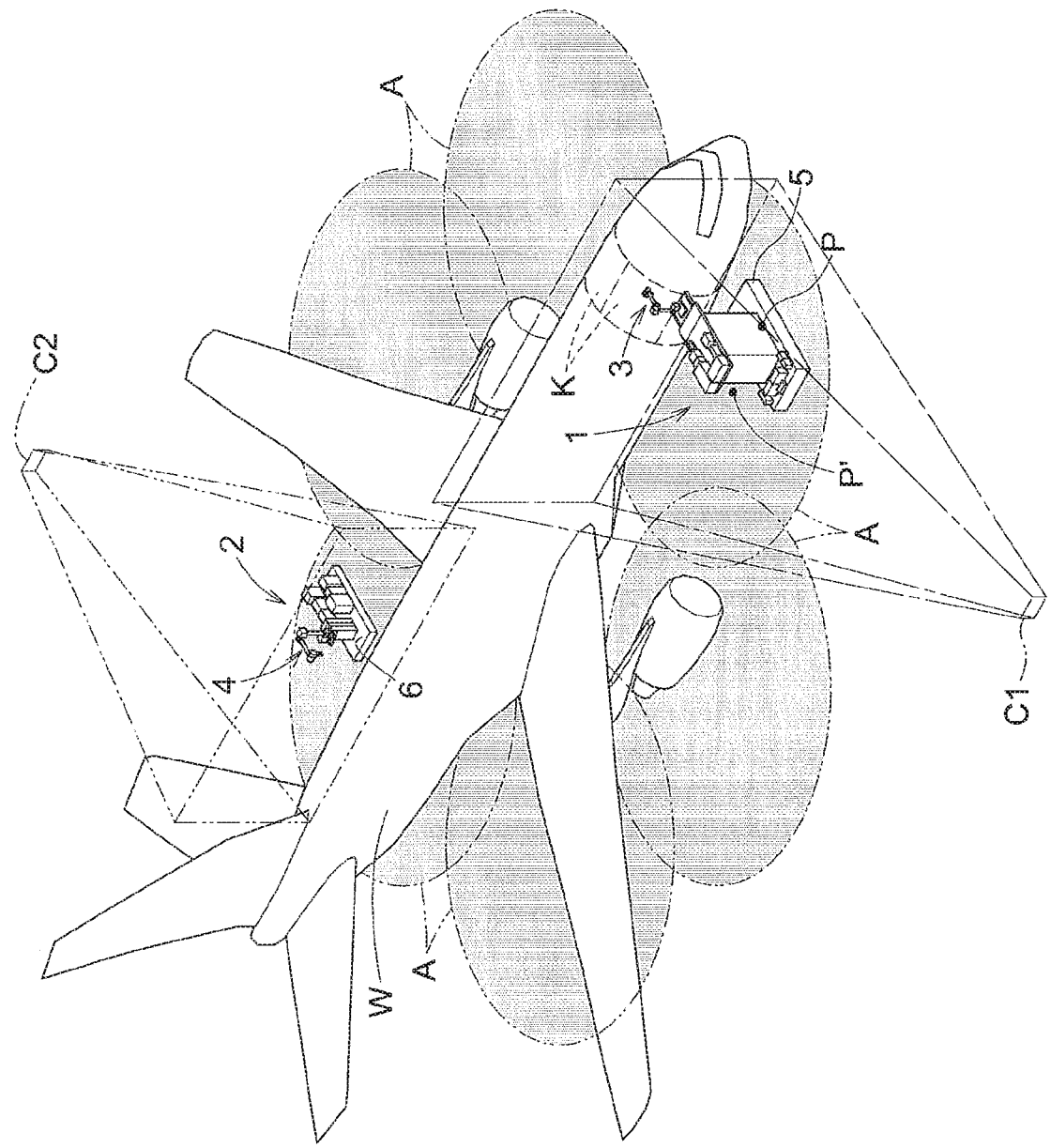
FIG. 11 is a perspective view showing a condition in which the work machine has been moved to a designated work position nearby an aircraft.

Upon receipt of this movement instruction, the onboard controller 15 of the work machine 1 controls the self-propelled cart 5, whereby the work machine 1 is moved automatically to the designated work position P nearby the aircraft W as illustrated in FIGS. 10-11. Further, in association therewith, the orientation of the work machine 1 is also adjusted automatically to a work orientation in direct opposition to the aircraft W.

In this automatic movement to the designated work position P, the onboard controller 15 monitors the distance between the work machine 1 and the aircraft W continuously and in parallel therewith, based on the determination information provided by the movement distance sensor S1 mounted on the work machine 1.

And, as the onboard controller 15, via this monitoring, adds correction in the control of the self-propelled cart 5 based on the three-dimensional shape data Dw of the aircraft W and the captured-image data Dc of the position determination camera C1, the work vehicle 1 will be stopped at the designated work position P precisely.

Moreover, the onboard controller 15 monitors also presence/absence of any obstacle which may be present in the surrounding of the work machine 1 based on the determination information provided by the movement distance sensor S1 mounted on the work machine 1.

By this monitoring, the onboard controller 15 will stop the self-propelled cart 5 in case presence of an obstacle has been detected, thus avoiding collision with this obstacle and also will issue an alarm for reporting the presence of the obstacle.

Further, after stopping the work machine 1 at the designated work position P, the onboard controller 15 will control the tilt adjustment device 7 based on detection information of the level sensor S2, thus adjusting the self-propelled cart 5 to a substantially perfectly horizontal posture.

<Fourth Step>

Figure 12:
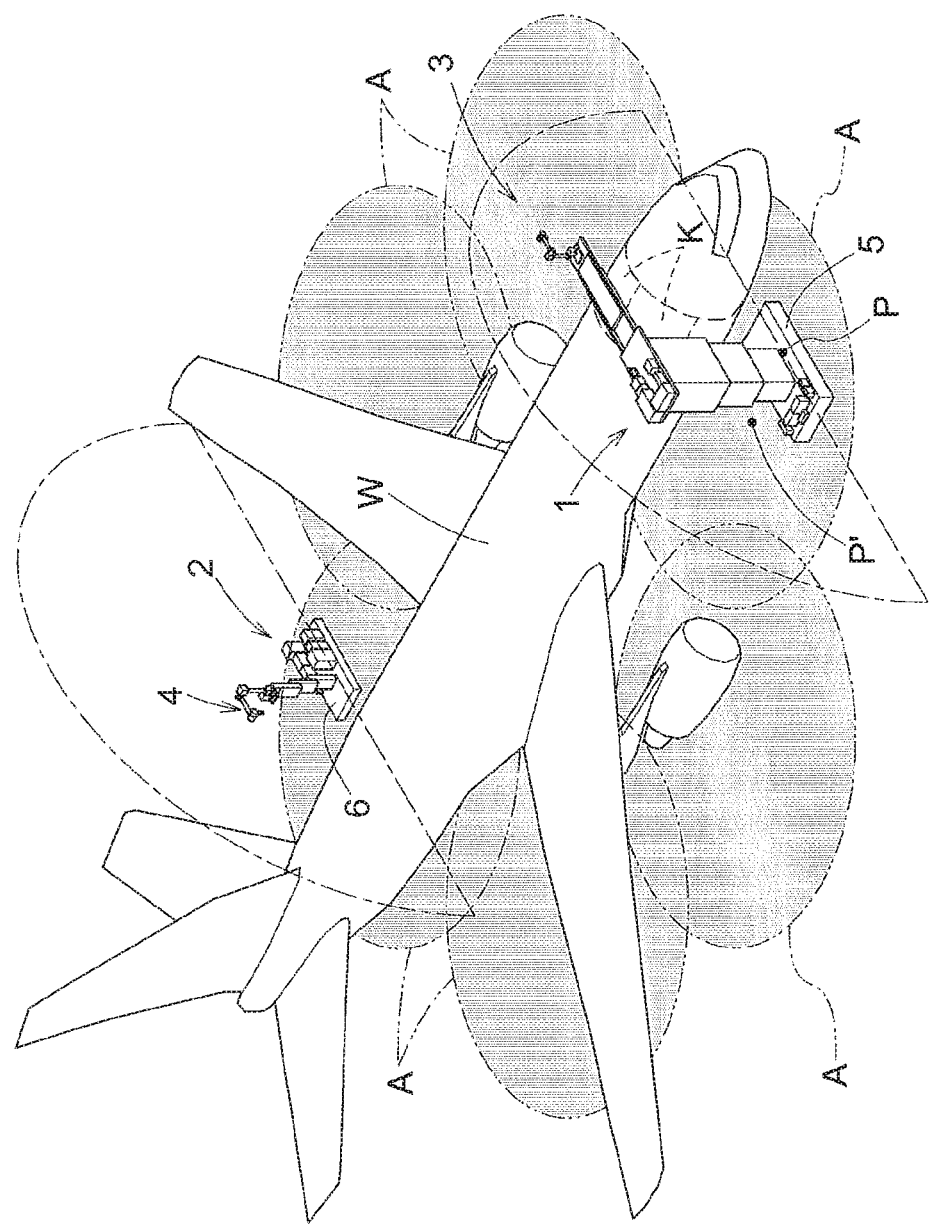
FIG. 12 is a perspective view illustrating an extension/contraction movement of the lift device and the feeder device at a designated work position.
Figure 13:
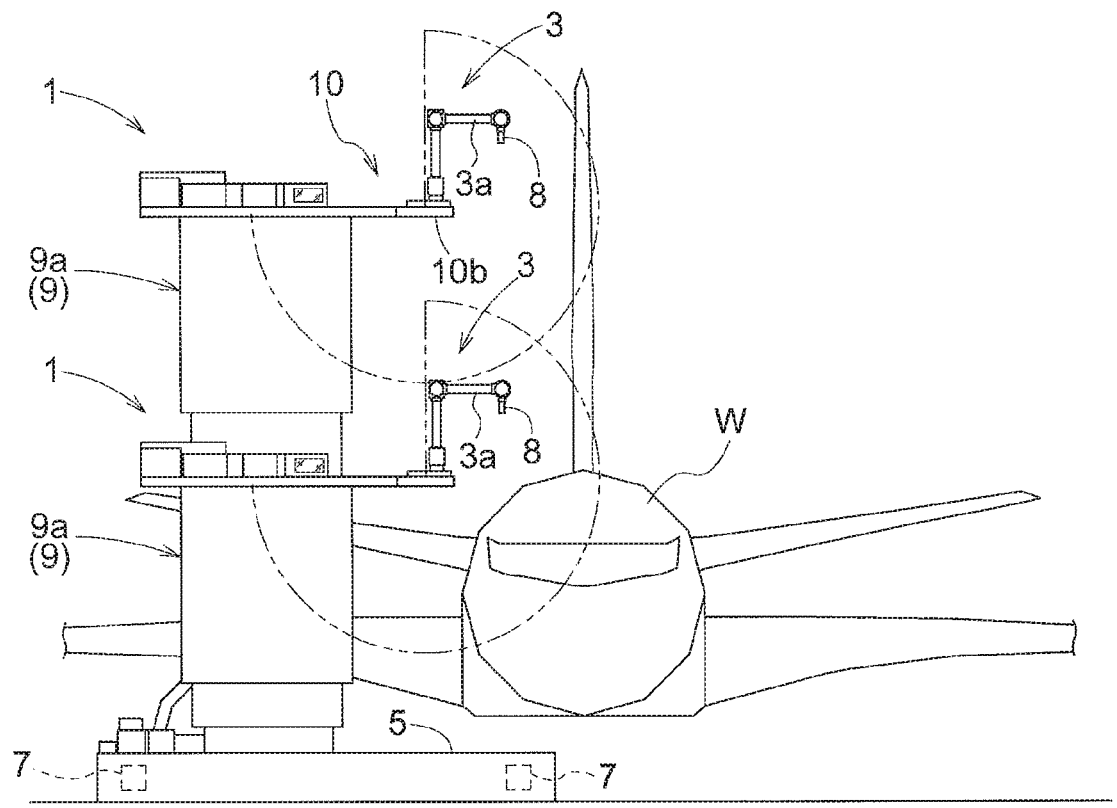
FIG. 13 is a front view illustrating an extension movement of the lift device at the designated work position.
Figure 14:
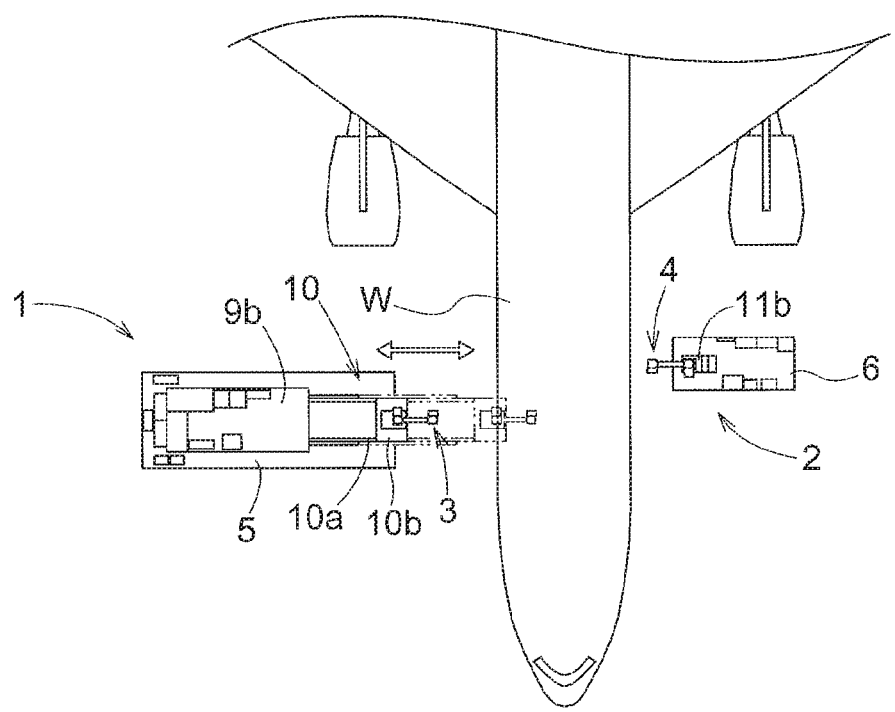
FIG. 14 is a plan view illustrating an extension movement of the feeder device at the designated work position.

After the above-described adjustment of the (horizontal) level of the self-propelled cart 5, the onboard controller 15, based on the three-dimensional shape data Dw of the aircraft W transmitted from the general controller 16 and the distance information relative to the machine body of the aircraft W obtained by the movement distance sensor S1 mounted on the feeder table 10, as illustrated in FIGS. 12-14, will elevate the work robot 3 to a required height (altitude) by extending the lift tower section 9a of the lift device 9 and also will subsequently extend the extension/contraction arm 10a of the feeder device 10 to move the work robot 3 closer to the machine body outer face of the aircraft W.

Namely, by these operations of the lift device 9 and the feeder device 10, the work robot 3 of the work machine 1 is caused to be moved close to one of the treatment sections K set in the machine body outer face of the aircraft W.

<Fifth Step>

Thereafter, based on the three-dimensional shape data Dw of the aircraft W and the distance information relative to the machine body of the aircraft W obtained by the movement distance sensor S3 mounted to the work arm 3a of the work robot 3, the onboard controller 15 will control arm movements of the work robot 3, thereby to move the treatment machine 8 held to the work arm 3a along the machine body outer face of the aircraft W while providing a treating action on this machine body outer face of the aircraft W. With this, one treatment section K in the machine body outer face of the aircraft W is treated.

Figure 15:
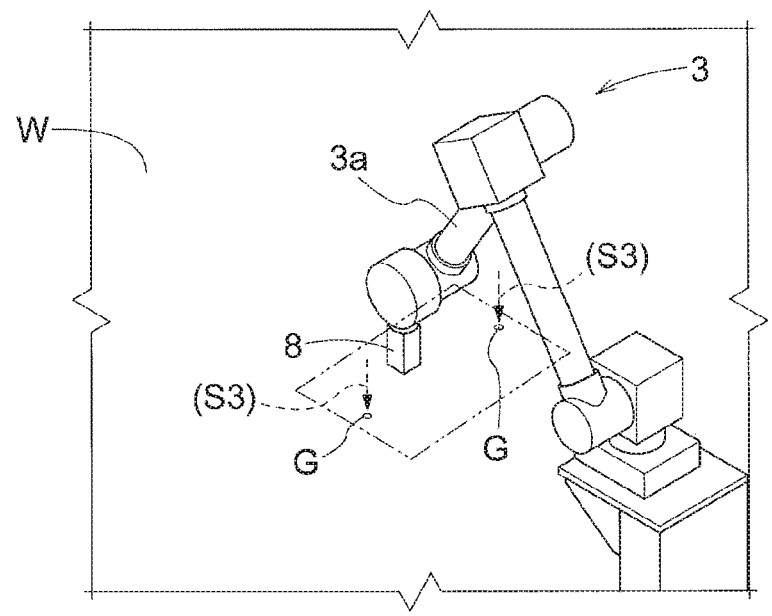
FIG. 15 is a perspective view for explaining a posture control of a treatment machine.

Also, in the above-described movement of the treatment machine 8 by the robot movements, the onboard controller 15 will determine a distance between the sensor S3 and a determination point G for a plurality of such determination points G on the machine body outer face around the treatment machine 8, as shown in FIG. 15.

Further, based on the result of this determination, the onboard controller 15 will calculate tilt of the machine body outer face part to be treated by the treatment machine 8.

And, the onboard controller 15 will add a correction to posture control of the treatment machine 8 based on the three-dimensional shape data Dw of the aircraft W, based on the result of the above-described calculation, whereby the treatment machine 8 will be caused to provide its treatment action with constantly keeping its vertical posture relative to each treatment part of the machine body outer face.

Figure 16:
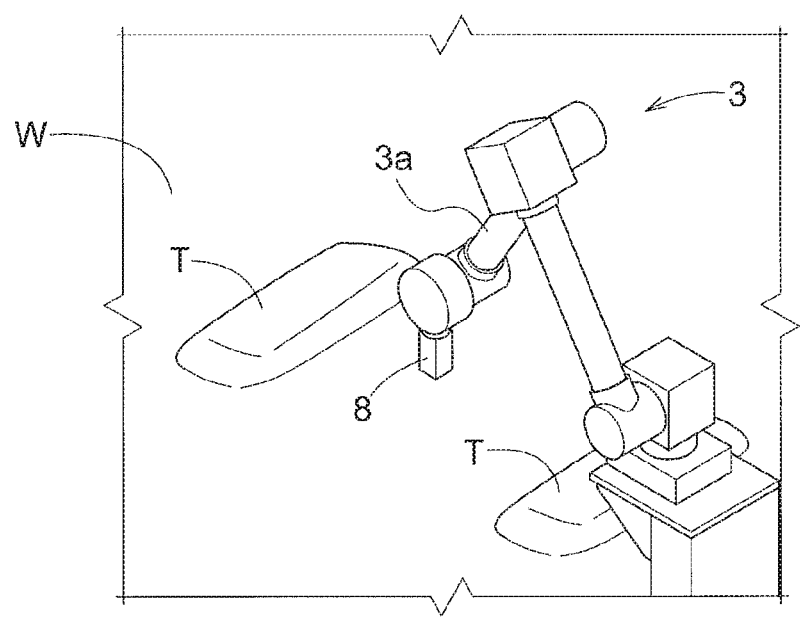
FIG. 16 is a perspective view for explaining a detour (bypass) control of the treatment machine.

Moreover, in the course of the movement of the treatment machine 8 by the robot movements, as illustrated in FIG. 16, the onboard controller 15 provides a further function of controlling the work robot 3 in such a manner as to move the treatment machine 8 with circumventing (detouring) a protruding object T if such protruding object T of the aircraft W is detected by the protruding object sensor S4 mounted to the work arm 3a.

<Sixth Step>

Upon completion of the treatment on the one treatment section K in the machine body outer face of the aircraft W at the fifth step described above, the onboard controller 15 will again operate the lift device 9 and the feeder device 10 based on the three-dimensional shape data Dw of the aircraft W and the distance information relative to the machine body of the aircraft W obtained by the movement distance sensor S1 mounted to the feeder table 10, whereby the work robot 3 will be caused to move closer to a next treatment section K in the machine body outer face of the aircraft W.

And, by implementing the above-described fifth step again on this next treatment section K, this next one treatment section K in the machine body outer face of the aircraft W is treated.

<Seventh Step>

With repetition of these fifth and sixth steps, a treatment work on each treatment section K with locating the work machine 1 at one designated step position P is completed. Then, the onboard controller 15 will contract the extension/contraction tower section 9a of the lift device 9 and the extension/contraction arm 10a of the feeder device 10, thereby to return the work robot 3 to its storage position in the work machine 1.

Thereafter, the general controller 16, based on the recognized relative position relation between the work machine 1 and the aircraft W, will transmit to the onboard controller 15 a movement instruction for moving the work machine 1 to a next designated work position P' near the aircraft W within the same work area A.

In response to this movement instruction, the onboard controller 15 will move the work machine 1 to the next designated work position P' in the same manner as the third step described above.

Further, at this designated work position P', the onboard controller 15 controls the tilt adjustment device 7 again, based on detection information of the level sensor S2, thus adjusting the the self-propelled cart 5 to the horizontal posture again.

Thereafter, with repletion of the fourth through seventh steps, treatment works on one work area A are completed.

And, upon completion of the treatment works in one work area A, for each one of the remaining work areas A, the treatment works will be carried out similarly in the order of from the first to seventh step, whereby one kind of treatment work among a plurality of kinds of surface treatment works is carried out and after its completion, after changing the treatment machine 8 to be held to the work arm 3a of the work robot 3, the surface treatment work on the machine body outer face of the aircraft W will be carried out for the respective work area A similarly.

In the above-described series of surface treatment works for the machine body outer face of the aircraft W, the low-place work machine 2 will implement controls similarly to the high-place work machine 1, except for the control for the feeder device 10.

Incidentally, the high-place work machine 1 and the low-place work machine 2 are used basically as a pair, and will be controlled as such in such a manner to avoid mutual interference between work areas thereof, by e.g. disposing them at positions opposite to each other across the treatment subject W therebetween.

INDUSTRIAL APPLICABILITY

The present invention is applicable to a surface treatment of various kinds of large objects, not limited to an aircraft, but including a railway car, a boat, a rocket, a bridge, a housing, etc.

DESCRIPTION OF SIGNS

W: aircraft (treatment-subject object)
8: treatment machine
3, 4: work robot
3a, 4a: work arm
5, 6: self-propelled cart
1, 2: trackless type work machine
X: robot moving device (lift device, feeder device)
13: battery
9: extension/contraction type lift device
9b: lift table
10b: feeder table
10: extension/contraction type feeder device
Y: supply source device
12: power source connection section
1: high-place work machine
2: low-place work machine

The invention claimed is:

1. A surface treatment system for an object configured to cause a treatment machine for treating a surface of the object to be held by a leading end portion of a work arm of a work robot and to move the treatment machine relative to the surface of the object by a movement of the work robot, thus treating the surface of the object by the treatment machine, the surface treatment system comprising:
a trackless work machine mounting the work robot on a self-propelled cart;
wherein the trackless work machine mounts a robot moving device for moving the work robot relative to the self-propelled cart at least in a height direction and mounts also a battery capable of supplying traveling power for the self-propelled cart;
wherein the trackless work machine comprises, as the robot moving device, an extendible/contractible lift device configured to vertically move a lift table by an extension/contraction movement, and an extendible/contractible feeder device mounted on the lift table and configured to move a feeder table by an extension/contraction movement closer to or away from the lift table in the horizontal direction;
wherein the work robot is mounted on the feeder table;
wherein a control device is provided for controlling the lift device and the feeder device; and
wherein the control device operates the lift device and the feeder device, based on distance information relative to the object determined by a movement distance sensor mounted on the feeder table.

2. The surface treatment system of claim 1, wherein the trackless work machine comprises a power source connection section configured to receive supply of electric power from a power source section located nearest in its surrounding.

3. The surface treatment system of claim 1, further comprising a plurality of trackless work machines comprising a high-place work machine mounting a robot moving device for a high place having a high maximum reach height in a movement of a work robot in a height direction and a low-place work machine mounting a robot moving device for a low place having a low maximum reach height in a movement of a work robot in the height direction.

4. The surface treatment system of claim 1, wherein the trackless work machine mounts a plurality of kinds of the treatment machine that are exchangeable and detachably attachable to the leading end portion of the work arm respectively.

5. The surface treatment system of claim 1, wherein the trackless work machine mounts a supply source device for supplying the treatment machine with a fluid to be used in a surface treatment of the object.

6. The surface treatment system of claim 1, wherein the control device operates the lift device and the feeder device, based on the distance information relative to the object determined by the movement distance sensor and on three-dimensional shape data of the object.

* * * * *